Dec. 23, 1958

J. JAMMET 2,865,976

METHOD FOR THE INSULATION AND ASSEMBLY OF FLAT DRY CELLS

Filed Dec. 7, 1953

INVENTOR
Jean Jammet

BY Adams + Burk
ATTORNEYS

United States Patent Office 2,865,976
Patented Dec. 23, 1958

2,865,976
METHOD FOR THE INSULATION AND ASSEMBLY OF FLAT DRY CELLS

Jean Jammet, Poitiers, France, assignor to Societe de la Pile Leclanché, Chasseneuil du Poitou (Vienne), France Application December 7, 1953, Serial No. 396,540

Claims priority, application France December 8, 1952

8 Claims. (Cl. 136—111)

The present invention relates to a method of assembling dry cells of the flat type in a common container, and more particularly to a method of assembling a battery composed of a plurality of flat dry cells in a common container or casing of insulating material in which the individual elements or units of the dry cells are successively piled one on the other while each anode plate is inserted in a groove provided in the casing.

The known methods for insulating and assembling batteries made of flat dry cells may be divided generally into two categories.

According to the methods of the first category, the elements of one battery are encased individually and insulated, thereupon the elements thus pre-assembled are piled or stacked on one another and the battery thus obtained may or may not be provided with a common insulation. These methods are efficient as regards the insulation and preservation of the battery but they are onerous and cumbersome.

According to the more economical methods of the second category, the elements are piled or stacked on top of each other in a single casing which at the same time provides insulation for the units and that of the battery.

Techniques employed until now for that purpose generally consist in forming an insulating casing or envelope by means of varnish or coating. However, it appears that such methods of the second category did not lend themselves for the production of high quality batteries.

Accordingly, the present invention relates to a method of this latter type of method which assures the required insulation and conservation which are desirable in connection with the batteries.

It is, therefore, an object of the present invention to provide an improved method of assembling batteries composed of dry cells of the flat type in a single unitary casing.

It is another object of the present invention to provide a method of assembly for batteries made of flat dry cells which is simple, relatively inexpensive and permits the realization of high quality batteries.

Another object of the present invention resides in the improved method of insulating and assembling batteries consisting of flat dry cells in which the individual elements of the battery are directly piled on top of each other and are pressed together inside a common container or casing made of insulating material which is elastic and which cannot be attacked by the chemical constitutents of the cells.

According to another feature of the present invention the unitary casing is molded in a manner to be porous to gas, has an imperforate wall with a smaller internal cross sectional dimension than that occupied by the anode of the dry cell, and is provided with grooves molded therein, which in the unstretched condition of the casing are relatively deep and of smaller height than the total thickness of the anode and which serve each for accommodating the periphery of an anode in such a manner that during the assembly sufficient pressure is created between the common casing and the various anodes to assure good sealing between the individual elements.

In carrying out this invention the container or casing is made of a moulded plastic material having the following qualities: appreciable extensibility, high electrical resistivity, and sufficient permeability to gas to avoid the formation of appreciable internal pressures. Furthermore, the casing made of moulded plastic also should be hydrophobic and immune to attack by the constituent chemicals of the battery.

Polyvinyl chloride is an example of a material that can be used, though other products may be employed.

The use of such a casing or container in connection with the individual encasing methods of the elements results in an appreciable saving of insulating material and labor, due to the possibility of mechanization of the method.

Further objects, features and advantages of the present invention will become more obvious from the following description when taken in connection with the accompanying drawing which shows for purposes of illustration only, several embodiments in accordance with the present invention, and wherein Figure 1 is an elevational view partially in section of an embodiment of a battery made according to the method of the present invention;

Figure 1:
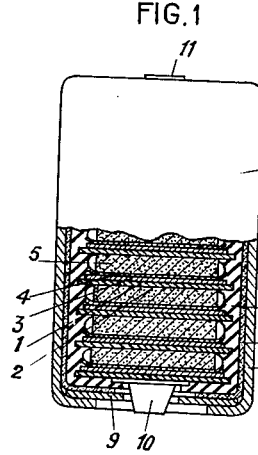

Referring now to the drawing wherein like reference numerals are used throughout the various views thereof to designate like parts, reference numeral 6 designates in all figures the common moulded container or casing having an imperforate wall with grooves 12 for receiving the edges of anode elements.

Figure 2:
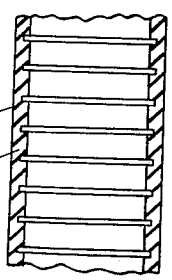
Figure 2 is a longitudinal sectional view of a common container or casing.

If it is assumed that a battery during assembly thereof has reached an element $n$, then the anode of element $n+1$ is introduced into and is placed inside the common insulating casing or container 6. The edge of anode element $n+1$ fits inside groove 12 (Figure 2) directly above the cathode of element $n$. As illustrated in Figure 1, this anode consists of a metal plate 1, the lower side of which is covered with an impermeable conducting varnish 2. Hereinafter plate 1 is called "zinc" because this metal is widely used for the anode of dry cells. However, it is understood that this does not preclude the use of other materials.

When the anode 1 is in position, a layer 3 consisting of electrolytic material is placed on the upper surface thereof. The electrolyte is usually a paste of suitable composition and is gelled so that it can withstand appreciable pressures without escaping or leaking over the edge. A relatively porous, cup-shaped fibrous separator 4 made, for example, of paper is placed on top of the electrolyte layer 3 (Figure 1).

The element 5, hereinafter called for convenience sake the "depolarising mass," is then introduced into and placed in the insulating container or casing 6 inside the cup formed by the paper 4.

The assembly of element $n+1$ of the battery is now completed.

The next element, namely anode $n+2$ is then introduced into the casing 6 and the same procedure is repeated as with dry cell $n+1$.

After completing the assembly an envelope 7 porous to gas and a binding jacket 8 are used as final cover over the battery. These components will be discussed more fully hereinafter.

Sealing washers 9 and contact terminals 10 complete the battery.

In Figure 1 of the assembly a contact terminal is illustrated in the shape of a metal part 10 pressed into contact against the anode of the first element. However, other forms of terminals may also be used. For instance, the terminals may consist of wires soldered to the terminals of the battery. To permit this, the first anode is not coated with a conducting varnish 2.

The following description will now illustrate how various methods, which are part of this invention, may be realized which ensure particularly well sealed joints between the units by placing the edge of the zinc plate 1 inside a suitably shaped groove 12, made during the moulding of the common container or casing 6.

Figure 3:
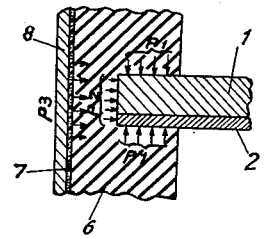
Figure 3 is an enlarged detailed view showing the principle of sealing between two adjacent elements at anode level.

According to a first step of general nature in accordance with the present invention the sealing of the joints is obtained by the formation of pressures $P_1$, $P_2$ and $P_3$ (Figure 3).

Figure 4:
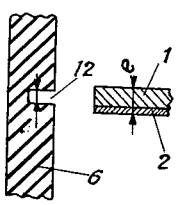
Figures 4 to 12 are detailed views illustrating various embodiments for sealing methods between adjacent elements in accordance with the present invention.
Figures 5, 6:
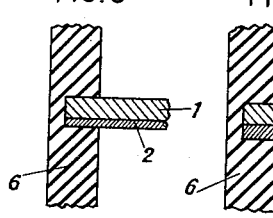

Pressure $P_1$ is caused by the fact that the total thickness $e$ of the zinc 1 and of the conducting varnish 2 are clearly greater than groove height $h$. Figure 4 illustrates the anode and the groove before placing the anode into position. Figure 5 is a similar view illustrating the same after the anode is emplaced in position.

In order to maintain and possibly increase the pressure $P_1$ with time, a common plasticizing substance may be selected for the container 6 and the conducting varnish 2. The migration of the plasticizer from the container 6 into the conducting varnish 2 causes, some days after manufacture, an appreciable swelling of the peripheral portion of the varnish, as illustrated in Figure 6, thereby further increasing the pressure $P_1$.

Figure 7:
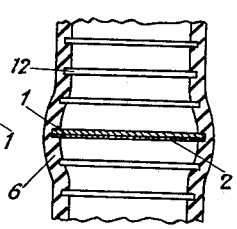

The pressure $P_2$ is caused by pressing the container 6 to the edge of the zinc. For that reason the perimeter of the zinc is greater than the perimeter of the bottom of the groove 12, as illustrated in an exaggerated manner in Figure 7.

It should be noted here that the pressure $P_2$ may be increased by partially deplasticizing the casing 6 which results in a general reduction in size thereof.

The pressure $P_3$ is caused by the binding of the battery inside jacket 8 made of metal or plastic material.

Other methods or steps forming part of this invention, may also contribute in improving the sealing between two adjacent elements or units.

Figures 8, 9:
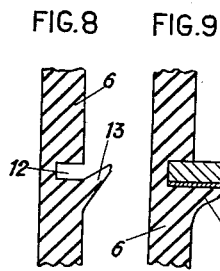

For example, Figure 8 shows that during moulding of the common container or casing 6 projections 13 may be provided, whereby each rim projection 13, which extends the lower edge of a groove 12, fits under the periphery of the layer of the conducting varnish 2 (Figure 9).

Figures 10, 11:
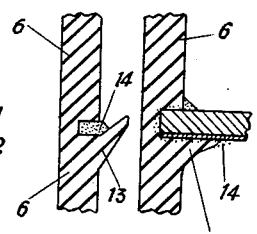

As illustrated in Figure 10, an insulating grease 14 of a highly water-repellent type may be applied to the groove 12 with a projection 13; after placing the anode into position, the grease 14 spreads around the entire periphery of the anode, as illustrated in Figure 11.

During the moulding of the common container or casing 6 projections 15 (Figure 12) may be formed around the upper edge of the groove 12, forming a baffle between the electrolyte 3 and the zinc 1. The baffle 15 improves the sealing and more particularly prevents the depolarizing mass 5 from coming into contact with the zinc.

It should be noted that the varnishing of the edge of the zinc which is often used with other methods, is obviated or rendered useless by the penetration of the edge of the zinc into the groove 12 and the baffle action of projection 15.

The various methods explained hereinabove which assure proper sealing between two adjacent elements are combined in the embodiment shown in Figure 12.

As already explained before, the battery is held or pressed together inside a shrinkable porous container 7. This container 7 ensures the free escape of gases which may be produced in the various units or elements after encasement of the battery inside jacket 8 (Figure 1). This container can be made of a paper having a suitable quality. As illustrated in Figure 1, the porous container 7 is folded over the extremities of the battery. After emplacement of sealing washers 9 and terminals 10, the retainer jacket 8 is also folded over the extremities of the battery. The dimensions of the various parts or components were so selected as to provide escape holes for the gases around terminals 10.

The above-described methods of assembly may be used in connection with any flat dry cells, whether primary or secondary cells.

Figure 8 shows that it is possible to obtain during the moulding of the common container 6 projections 13, each rim projection prolonging the lower edge of groove 12 fits under the periphery of the layer of the conducting varnish (Figure 9).

As illustrated in Figure 10 an insulating grease 14 of a highly water repellent type can be smeared on the groove and on projection 13; after placing the anode the grease spreads around the periphery of the anode as illustrated by Figure 11.

During the moulding of the common container 15 (Figure 12) projections 15 can be formed around the upper edge of the groove 12, forming a baffle between electrolyte 3 and zinc 1. This baffle improves sealing and more specially prevents the depolarizing mass 5 from coming into contact with the zinc.

It should be noted that the varnishing of the edge of the zinc which is often used with other methods is not necessary because of the forcing of the edge of the zinc into the groove and the baffle action of projection 15.

Figure 12:
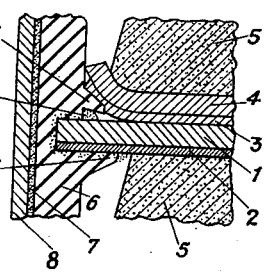

The various processes explained before ensuring the sealing between two adjacent elements are shown in Figure 12.

As has been explained elsewhere the battery is held pressed inside a shrinkable porous container 7. This container ensures the free escape of gases which may form in the various units after binding of the battery inside jacket 8 (Figure 1). This container can be made of the right quality paper as illustrated in Figure 1. The porous container is folded over the extremities of the battery. After placing sealing washers 9 and terminals 10, the binding jacket is also folded over the extremities of the battery. The dimensions of the various components were selected to provide escape holes for the gases around terminals 10.

What is claimed is:

1. A flat dry cell battery in which the various elements of the battery are piled on top of each other and are gripped along the interior of a relatively thin-walled common casing made of insulating material which is not attacked by the constituents of the cells, comprising a common casing having an imperforate wall with grooves molded therein each serving for the accommodation of the periphery of an anode, at least one anode with the periphery thereof accommodated in a corresponding one of said grooves, a layer of conducting varnish covering the entire surface of the depolarizing face of said anode, said casing being made of elastic material of a thickness to retain permeability thereof to gases, and the height of each groove in the normal unstretched condition of the casing being less than the thickness of each anode with its layer of conducting varnish and the perimeter of the bottom of each groove in the normal unstretched condition of said casing being smaller than that of said anode whereby said casing is placed under tension upon installation of said anode into said one groove.

2. A battery according to claim 1, wherein said elements are circular.

3. A battery according to claim 1, wherein said elements have a curved periphery.

4. A battery according to claim 1, wherein said layer of conducting varnish and said common casing comprise the same plasticizing substance to maintain and possibly increase the gripping pressure.

5. A battery according to claim 1, wherein said common casing is shrunk by partial deplastification.

6. A battery according to claim 1, further comprising an annular projection formed during preliminary molding of said casing to extend inwardly a corresponding groove and on which rests said anode.

7. A battery according to claim 1, wherein each groove is provided with an insulating grease having hydrophobic characteristics.

8. A battery according to claim 1, wherein said common casing is provided with an annular projection molded therein and extending inwardly of each groove, said annular projection being placed underneath said anode, a layer of an electrolytic paste placed underneath said anode, said annular projection forming a baffle plate between said anode and said paste.

References Cited in the file of this patent

UNITED STATES PATENTS

| | | |
|---|---|---|
| 1,285,660 | Ford | Nov. 26, 1918 |
| 1,624,455 | Yngve | Apr. 12, 1927 |
| 2,521,800 | Martinez et al. | Sept. 12, 1950 |
| 2,526,789 | Woodring | Oct. 24, 1950 |
| 2,536,697 | Ruben | Jan. 2, 1951 |
| 2,723,301 | West et al. | Nov. 8, 1955 |